(12) United States Patent
Oyama et al.

(10) Patent No.: US 9,808,934 B2
(45) Date of Patent: Nov. 7, 2017

(54) ROBOT CONTROL APPARATUS JUDGING RESTART OF OPERATION PROGRAM

(71) Applicant: FANUC CORPORATION, Yamanashi (JP)

(72) Inventors: Takumi Oyama, Yamanashi (JP); Tomoyuki Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 68 days.

(21) Appl. No.: 15/056,301

(22) Filed: Feb. 29, 2016

(65) Prior Publication Data

US 2016/0257003 A1 Sep. 8, 2016

(30) Foreign Application Priority Data

Mar. 6, 2015 (JP) ................................ 2015-045350

(51) Int. Cl.
    G05B 19/04 (2006.01)
    G05B 19/18 (2006.01)
    B25J 9/16 (2006.01)

(52) U.S. Cl.
    CPC ........... B25J 9/1676 (2013.01); B25J 9/1674 (2013.01); G05B 2219/40201 (2013.01)

(58) Field of Classification Search
    CPC .......... G05B 2219/40201; B25J 9/1676; B25J 9/1674
    USPC ....................................................... 700/255
    See application file for complete search history.

(56) References Cited

U.S. PATENT DOCUMENTS

| 5,363,474 A * | 11/1994 | Sarugaku | B25J 9/1674 |
|---|---|---|---|
| | | | 700/256 |
| 6,298,283 B1 * | 10/2001 | Kato | B25J 9/1676 |
| | | | 318/16 |
| 9,452,532 B2 * | 9/2016 | Komatsu | B25J 9/1676 |
| 9,579,798 B2 * | 2/2017 | Wang | B25J 9/1676 |
| 9,681,920 B2 * | 6/2017 | Bowling | A61B 34/30 |
| 2013/0006422 A1 * | 1/2013 | Komatsu | B25J 9/1674 |
| | | | 700/258 |
| 2014/0039517 A1 * | 2/2014 | Bowling | B25J 13/00 |
| | | | 606/130 |
| 2014/0039681 A1 * | 2/2014 | Bowling | A61B 34/32 |
| | | | 700/261 |

(Continued)

FOREIGN PATENT DOCUMENTS

| CN | 1086323 A | 5/1994 |
|---|---|---|
| CN | 1460052 A | 12/2003 |

(Continued)

Primary Examiner — Harry Oh
(74) Attorney, Agent, or Firm — Hauptman Ham, LLP (57) ABSTRACT

A robot control apparatus includes a stop command unit which stops a robot. A first external force judgement value smaller than a stop judgement value and a second external force judgement value smaller than the first external force judgement value are previously determined. The stop command unit inhibits a restart of execution of an operation program when, in a state where the execution of the operation program is temporarily stopped, an external force is continuously equal to or less than the first external force judgement value during a period of a first time length, and additionally, the external force continuously exceeds the second external force judgement value during a period of a second time length.

3 Claims, 5 Drawing Sheets

(56) References Cited

U.S. PATENT DOCUMENTS

| | | | |
|---|---|---|---|
| 2014/0222207 A1* | 8/2014 | Bowling | A61B 34/32 700/261 |
| 2015/0290809 A1* | 10/2015 | Nakagawa | B25J 9/1676 700/258 |
| 2015/0314445 A1* | 11/2015 | Naitou | B25J 9/1674 700/258 |
| 2015/0328771 A1* | 11/2015 | Yuelai | B25J 9/1612 414/730 |
| 2015/0374446 A1* | 12/2015 | Malackowski | A61B 19/2203 606/130 |
| 2016/0089211 A1* | 3/2016 | Bowling | A61B 19/22 606/130 |
| 2016/0089787 A1* | 3/2016 | Kuroshita | B25J 9/1674 700/260 |
| 2016/0167231 A1* | 6/2016 | Nakayama | B25J 9/1676 700/255 |
| 2016/0176052 A1* | 6/2016 | Yamamoto | B25J 9/1676 700/255 |
| 2016/0207197 A1* | 7/2016 | Takahashi | B25J 9/1674 |
| 2016/0243700 A1* | 8/2016 | Naitou | B25J 9/1633 |

FOREIGN PATENT DOCUMENTS

| | | |
|---|---|---|
| CN | 101239467 A | 8/2008 |
| JP | H06-155346 A | 6/1994 |
| JP | 9-248778 A | 9/1997 |
| JP | 2002-224983 A | 8/2002 |
| JP | 2006-021287 A | 1/2006 |
| JP | 2008-6517 A | 1/2008 |
| JP | 2012-10472 A | 1/2012 |
| JP | 2013-43250 A | 3/2013 |
| JP | 2014-166817 A | 9/2014 |

* cited by examiner

ROBOT CONTROL APPARATUS JUDGING RESTART OF OPERATION PROGRAM

RELATED APPLICATIONS

The present application claims priority to Japanese Patent Application Number 2015-045350, filed Mar. 6, 2015, the disclosure of which is hereby incorporated by reference herein in its entirety.

BACKGROUND OF THE INVENTION

1. Field of the Invention

The present invention relates to a robot control apparatus which controls a robot.

2. Description of the Related Art

Recently, automatically driven robots have often been used. Such robots are driven based on a previously created operation program. During a period in which a robot is operated, the robot sometimes receives a force from outside (hereinafter referred to as "external force"). For example, during a period in which a robot is automatically operated, surrounding equipment or a worker sometimes comes into contact with the robot. In such a case, a robot system is known to stop the robot by detection of an external force or perform an avoiding operation for avoiding a contacted object.

For example, Japanese Laid-open Patent Publication No. H06-155346 discloses a robot teaching apparatus which limits operation of a robot according to an output of a force sensor arranged at a hand portion of the robot. Additionally, Japanese Laid-open Patent Publication No. 2006-21287 discloses a contact force detection apparatus which detects a force applied to a robot arm by arranging a force detector at a root portion of the robot arm. This publication discloses that a control apparatus subtracts an internal force due to operation of the robot arm from the force applied to the robot arm to calculate a contact force applied to the robot arm. In addition, the publication also discloses that an operation of reducing a contact force of the robot arm is performed when the contact force is detected.

A typical industrial robot is configured so that when an external force (a contact force) applied to the robot is detected, an operation program is stopped to ensure safety. In recent years, a robot system has become known in which a worker performs work in collaboration with a robot. This robot system is also designed so that when an external force exceeds a predetermined judgement value, execution of an operation program is stopped.

After a robot is automatically stopped, operation of the robot is preferably restarted in a short time to improve productivity. For example, after a worker contacts with a robot and then the robot is stopped, the worker may immediately step away from the robot. As in this case, when the external force is eliminated after stopping the robot, operation of the robot is preferably immediately restarted.

Alternatively, for example, as in the apparatus described in Japanese Laid-open Patent Publication No. 2006-21287, when the detector is arranged at a base portion of the robot, even vibration of the ground may cause a judgement that an external force has been applied to the robot. For example, when a carrier vehicle travels near a robot, vibration may be transmitted to the robot. Then, the robot may be stopped even when no external force is applied thereto. In such a case, it is preferable to immediately restart operation of the robot.

On the other hand, depending on circumstances at a time of stop of the robot, the stop state of the robot is preferably maintained to ensure safety of the worker. In other words, depending on the kind of external force applied to the robot, it is preferable to maintain the stop state of the robot.

SUMMARY OF INVENTION

A robot control apparatus according to the present invention is a robot control apparatus which controls a robot driven based on an operation program, the robot control apparatus including an external force estimation unit which estimates an external force applied to the robot, a stop command unit which stops the robot based on an external force, and a judgement value storage unit which stores judgement values relating to the external force. The judgement value storage unit previously stores a stop judgement value for temporarily stopping the robot, a first external force judgement value smaller than the stop judgement value and for restarting driving of the robot, and a second external force judgement value smaller than the first external force judgement value. The stop command unit performs control to temporarily stop execution of the operation program when the external force exceeds the stop judgement value during a period during which the robot is driven based on the operation program. The stop command unit performs control to inhibit a restart of the execution of the operation program when, in a state where the execution of the operation program is temporarily stopped, the external force is continuously equal to or less than the first external force judgement value during a period of a predetermined first time length, and additionally, the external force continuously exceeds the second external force judgement value during a period of a predetermined second time length.

In the above invention, the robot control apparatus may include a time storage unit which stores a time at which the execution of the operation program is restarted based on the first external force judgement value. When the execution of the operation program is temporarily stopped after restarting the execution of the operation program, the stop command unit may calculate a driving time of the robot from the restart to the stop, and may perform control to inhibit the restart of the execution of the operation program when the driving time is less than a predetermined third time length.

In the above invention, the stop command unit may perform control to inhibit the restart of the execution of the operation program when the external force exceeds the first external force judgement value during a period of the first time length from a time at which the execution of the operation program is temporarily stopped.

DETAILED DESCRIPTION

Figure 1:
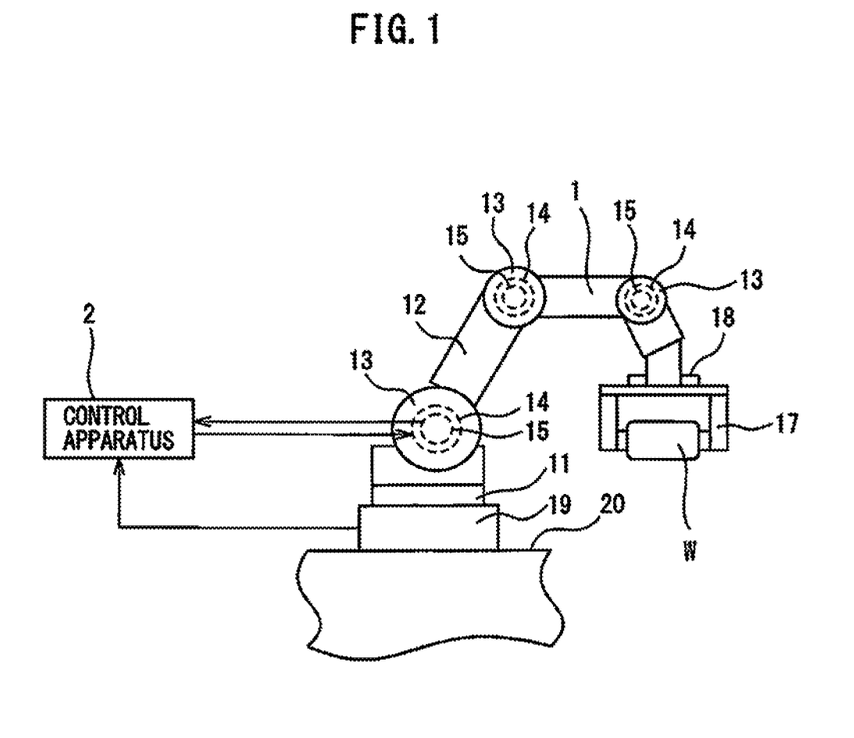
FIG. 1 is a schematic diagram of a robot system in an embodiment.

A description will be given of a robot control apparatus in an embodiment with reference to FIGS. 1 to 5. FIG. 1 is a schematic diagram of a robot system in the present embodiment. The robot system includes a robot 1 which conveys a workpiece W and a control apparatus 2 as a robot control apparatus which controls the robot 1. The robot 1 of the present embodiment is a multi-joint robot including an arm 12 and a plurality of joint units 13. A hand 17 has a function of holding and releasing the workpiece W.

The robot 1 includes an arm drive device which drives each of the joint units 13. The arm drive device includes an arm drive motor 14 arranged in the joint units 13. Driving the arm drive motor 14 allows the arm 12 to be bent at a desired angle at the joint units 13. In addition, the robot 1 of the present embodiment is formed so that an entire part of the arm 12 can be rotated around a rotation axis extending in a vertical direction. The arm drive device includes a drive motor which rotates the arm 12.

The robot 1 includes a hand drive device which closes and opens the hand 17. The hand drive device in the present embodiment drives the hand 17 by air pressure. The hand drive device includes a hand drive cylinder 18 connected to the hand 17, an air pump for supplying compressed air to the hand drive cylinder 18, and an electromagnetic valve.

The robot 1 includes a base part 11 supporting the arm 12. The robot 1 in the present embodiment includes a force detector 19 which detects a force applied to the base part 11. The force applied to the base part 11 is equivalent to a force applied to the robot 1. The force detector 19 is located at an underside of the base part 11. The force detector 19 in the present embodiment is fixed to an installation surface 20.

The force detector 19 in the present embodiment includes a metal substrate connected to the base part 11 and a distortion sensor attached onto a surface of the substrate. The distortion sensor is arranged at a plurality of points on the surface of the substrate. When a force is applied to the substrate in a predetermined direction, the substrate is slightly deformed. The distortion sensor detects an amount of deformation at a predetermined position on the substrate. Then, the force detector 19 calculates the force applied to the substrate, i.e., a force applied to the robot 1, based on the amount of deformation detected by the distortion sensor. The force detector is not limited to this form and can be of any form as long as it is formed to allow detection of a force applied to the robot 1.

The robot 1 in the present embodiment includes a state detector 16 which detects a position and a posture of the robot. The state detector 16 detects a position of a reference point of the arm 12, bending states of the arm 12 at the joint units 13, a direction in which the arm 12 is oriented, and the like.

The state detector 16 in the present embodiment includes a rotation angle detector 15 attached to each arm drive motor 14. The rotation angle detector 15 detects a rotation angle at which the each arm drive motor 14 is driven. Based on the rotation angle of the each arm drive motor 14, angles of the arm 12 at the joint units 13 can be detected. In addition, the state detector 16 includes a rotation angle detector which detects a rotation angle of the arm 12 with respect to the base part 11. Based on the detected rotation angle, a direction in which the arm 12 is extended can be detected.

The robot 1 is driven based on an operation command of the control apparatus 2. The arm drive device and the hand drive device are controlled by the control apparatus 2. For example, the rotation angle of the arm drive motor 14 and the air pressure of the hand drive cylinder 18 are controlled by the control apparatus 2. In addition, an output of the state detector 16 is input to the control apparatus 2.

Figure 2:
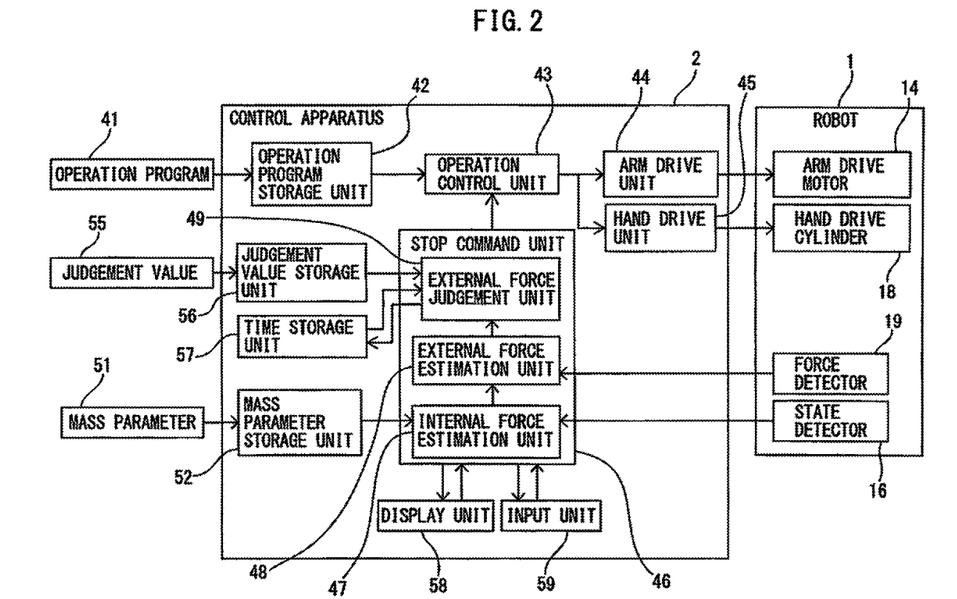
FIG. 2 is a block diagram of the robot system in the embodiment.

FIG. 2 shows a block diagram of the robot system in the present embodiment. With reference to FIGS. 1 and 2, a control for conveying a workpiece based on an operation program 41 will be explained in the present embodiment. The robot 1 can automatically convey a workpiece W from an initial position to a target position. The control apparatus 2 includes an arithmetic processing device having a CPU (central processing unit), a RAM (random access memory), a ROM (read only memory), and the like connected to each other via a bus.

The operation program 41 previously determined to perform operation of the robot 1 is input to the control apparatus 2. The operation program 41 is stored in an operation program storage unit 42. An operation control unit 43 sends an operation command for driving the robot 1 based on the operation program 41. The operation control unit 43 sends an operation command for driving the arm drive device to an arm drive unit 44. The arm drive unit 44 includes an electric circuit which drives the arm drive motor 14 and the like, and based on the operation command, supplies electric power to the arm drive motor 14 and the like. Driving the arm drive motor 14 allows adjustments in the bending angle of the arm 12, the direction thereof, and the like.

In addition, the operation control unit 43 sends an operation command for driving the hand drive device to a hand drive unit 45. The hand drive unit 45 includes an electric circuit for driving the air pump and the like, and based on the operation command, allows compressed air to be supplied to the hand drive cylinder 18. The hand 17 is open or closed by adjusting pressure of the air supplied to the hand drive cylinder 18.

A parameter for driving the robot is input to the control apparatus 2 of the present embodiment. The parameter includes a mass parameter 51. The mass parameter 51 includes information relating to a mass of each portion of the robot 1 and a mass of the workpiece W, which is for estimating an internal force applied to the robot 1. The mass parameter 51 is stored in a mass parameter storage unit 52 of the control apparatus 2.

The control apparatus 2 of the present embodiment includes a stop command unit 46 which sends a command for putting the robot 1 into a stopped state to the operation control unit 43. The stop command unit 46 is formed to allow a command for stopping driving of the robot 1 to be sent in both states of a period during which the robot 1 is driven and a period during which the robot 1 is stopped. Upon reception of the stop command, the operation control unit 43 stops execution of the operation program 41. Then, driving of the robot 1 is stopped. When the stop command is sent while the robot 1 is stopped, the operation control unit 43 maintains the stop state of the robot 1.

The stop command unit 46 includes an internal force estimation unit 47 which estimates an internal force generated by the mass of the robot 1 and operation thereof. The internal force estimation unit 47 calculates a force applied to the robot 1 by an own weight thereof when the robot 1 is operated in a state where no force is applied from outside the robot 1. The internal force can be calculated based on the position and posture of the robot detected by the state detector 16 and the mass parameter 51.

The stop command unit 46 includes an external force estimation unit 48 which estimates an external force applied to the robot 1 from outside the robot 1. The external force estimation unit 48 calculates the external force by subtracting the internal force estimated by the internal force estimation unit 47 from the force detected by the force detector 19.

The stop command unit 46 includes an external force judgement unit 49 which judges the calculated external force. The external force judgement unit 49 judges whether or not the calculated external force meets a predetermined condition. When the external force satisfies the predetermined condition, the stop command unit 46 sends a stop command for stopping the robot 1 to the operation control unit 43.

In addition, the external force judgement unit in the present embodiment judges based on a magnitude of an external force, without considering a direction in which the external force is applied. Judgement of an external force is not limited to this form and may be made in consideration of the direction of an external force. For example, when an X axis is set as a moving axis, the external force judgement unit may make judgement by a positive judgement value in a direction of the X axis.

Figure 3:
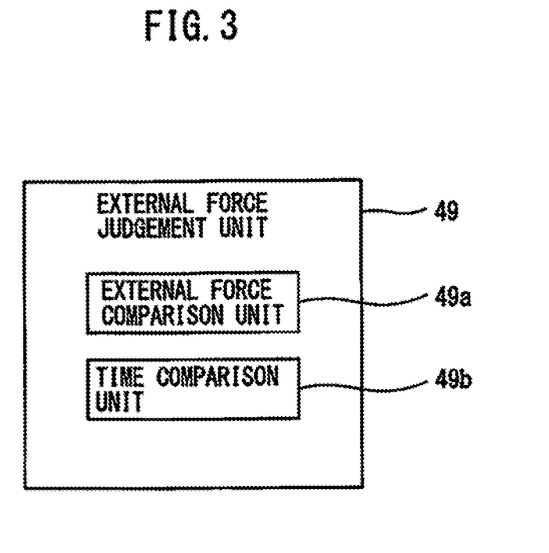
FIG. 3 is a block diagram of an external force judgement unit in the embodiment.

FIG. 3 shows a block diagram of the external force judgement unit in the present embodiment. The external force judgement unit 49 includes an external force comparison unit 49a which compares an external force estimated by the external force estimation unit 48 with a predetermined external force judgement value. Additionally, the external force judgement unit 49 includes a time comparison unit 49b which compares an elapsed time under a predetermined condition with a predetermined judgement value of elapsed time.

Referring to FIG. 2, the control apparatus 2 includes a judgement value storage unit 56. Judgement values 55 such as an external force judgement value and a judgement value of an elapsed time are previously determined and stored in the judgement value storage unit 56. The external force judgement unit 49 of the stop command unit 46 reads each judgement value from the judgement value storage unit 56. In addition, a single storage unit may be shared for the storage units such as the operation program storage unit 42, the mass parameter storage unit 52, and the judgement value storage unit 56.

Additionally, the control apparatus 2 includes a time storage unit 57 which stores a time at which the robot 1 was put into a predetermined state. The external force judgement unit 49 sends the time at which the robot 1 was put into a predetermined state to the time storage unit 57. The time storage unit 57 stores the time. In addition, the external force judgement unit 49 can perform a predetermined judgement by reading the time stored in the time storage unit 57.

The control apparatus 2 includes a display unit 58 and an input unit 59. The display unit 58 is formed to allow information relating to operation of the robot 1 to be displayed. An example of the display unit 58 can be a liquid crystal display device. The input unit 59 is formed so that a worker can input a desired command to the control apparatus 2. An example of the input unit 59 can be a keyboard or the like.

Next, a control of the robot control apparatus in the present embodiment will be explained. When the robot 1 is automatically stopped, driving of the robot 1 is sometimes necessary in order to automatically restart robot 1 depending on the state at the time of the stop. The control apparatus 2 of the present embodiment performs control to restart the driving of the robot or maintain the stop state thereof according to the kind of an external force applied to the robot 1.

Referring to FIGS. 1 to 3, the judgement values 55 include a stop judgement value for temporarily stopping the robot 1 when an external force applied to the robot 1 is large. The judgement values 55 include a first external force judgement value smaller than the stop judgement value and for restarting driving of the robot 1. Additionally, the judgement values 55 include a second external force judgement value smaller than the first external force judgement value and for inhibiting a restart of the driving of the robot.

In addition, the judgement values 55 include a first time length to be used together with the first external force judgement value and a second time length to be used together with the second external force judgement value. Furthermore, the judgement values 55 include a third time length for judging a driving time from restart of the driving of the robot to re-stop thereof. The first time length, the second time length, and the third time length are previously determined as judgement values for an elapsed time.

The stop command unit 46 of the control apparatus 2 sends a command for temporarily stopping execution of the operation program 41 to the operation control unit 43 when the external force exceeds a stop judgement value during a period during which the robot 1 is driven. The operation control unit 43 temporarily stops execution of the operation program 41. The robot 1 is stopped and operation is discontinued.

The external force estimation unit 48 calculates an external force even in the period during which the execution of the operation program 41 is temporarily stopped. Then, when the external force exceeds the first external force judgement value even once during a period of the first time length from a time at which the execution of the operation program 41 was temporarily stopped, control can be performed to inhibit the restart of driving of the robot 1. In other words, when a relatively large external force is detected in a predetermined period from the stop of the execution thereof, it can be judged that the cause of the stop of the robot 1 has not been eliminated. Accordingly, the stop command unit 46 inhibits the restart of driving of the robot 1.

On the other hand, when the external force is continuously equal to or less than the first external force judgement value during the period of the first time length from the time at which the execution of the operation program 41 was temporarily stopped, a restart of execution of the operation program 41 is considered. An example of the first time length which can be employed is a value within a range of from 2 to 3 seconds. For example, when a person contacts with the robot 1 but immediately steps away from the robot 1, a restart of driving of the robot 1 is considered.

However, in some cases, when the robot 1 is automatically stopped, the robot 1 is in a stopped state while maintaining a state where a relatively small external force is applied to the robot 1. For example, the robot 1 may be stopped by sandwiching any other object. The robot 1 may be stopped since another object is sandwiched between the arm 12 of the robot 1 and a wall. Alternatively, another object may contact with the robot 1 and may remain unmoved. In such a case, a relatively large external force is applied to the robot 1 at a moment when the object contacts with the robot 1. However, after that, a relatively small external force is applied to the robot 1. Thus, a relatively small external force may be continuously applied to the robot 1. When the external force is equal to or less than the first external force judgement value, driving of the robot 1 is restarted.

In the present embodiment, the second external force judgement value smaller than the first external force judgement value is provided. The stop command unit 46 performs control to inhibit a restart of execution of the operation program 41 when, in a state where the execution of the operation program 41 is temporarily stopped, the external force continuously exceeds the second external force judgement value during the period of the second time length. In other words, when the external force exceeding the second external force judgement value is continuously applied to the robot 1, the restart of driving of the robot 1 is inhibited regardless of the judgement based on the first external force judgement value. An example of the second external force judgement value which can be employed is a value larger than a noise included at least in the external force. A start time for the period of the second time length can be set to an arbitrary time at which the external force in the stop period exceeded the second external force judgement value. In addition, a time length shorter than the first time length can be set as the second time length. For example, a value of the second time length which can be employed is a value within a range of from 100 to 300 ms.

In the present embodiment, the time comparison unit 49*b* calculates a time elapsed from the stop of the robot 1 or a time elapsed from a time at which the external force exceeded the second external force judgement value. Then, the time comparison unit 49*b* judges whether or not these elapsed times are longer than the first time length or the second time length. The external force comparison unit 49*a* judges whether or not an estimated external force exceeds the first external force judgement value or the second external force judgement value.

When the stop command unit 46 inhibits the restart of execution of the operation program 41 in the stop period of the robot 1, the operation control unit 43 maintains the state where the execution of the operation program 41 is stopped. The display unit 58 displays, on the screen, a warning that the restart of driving of the robot 1 is inhibited. Then, a worker sees the warning on the display unit 58 and eliminates a cause for inhibition of the restart of driving of the robot 1. For example, another object in contact with the robot 1 is eliminated.

Next, the worker operates the input unit 59 to command the stop command unit 46 to restart the execution of the operation program 41. The stop command unit 46 sends a command for restarting the execution of the operation program 41 to the operation control unit 43. The operation control unit 43 restarts the execution of the operation program 41.

As described above, the control apparatus 2 of the present embodiment can detect a continuous small external force generated in cases such as when another object is sandwiched and can inhibit the restart of driving of the robot. On the other hand, in cases such as when the robot is stopped due to detection of vibration caused by a carrier vehicle traveling near the robot, the external force sometimes exceeds the second external force judgement value. However, since the external force is a force due to the vibration, a timing below the second external force judgement value is necessarily present, and the external force does not continuously exceed the second external force judgement value. In this case, as soon as the external force due to the vibration is eliminated, driving of the robot 1 can be restarted.

After restarting the driving thereof from the temporarily stopped state, the robot 1 is sometimes temporarily stopped again when the external force exceeds the first external force judgement value in a short time. In this case, it can be judged that a previous cause for the temporary stop has not been sufficiently eliminated. At this time, the control apparatus 2 performs control to inhibit the restart of execution of the operation program 41.

When the operation program 41 is temporarily stopped after restarting the execution of the operation program 41, the stop command unit 46 calculates a driving time of the robot 1 from the restart to the stop. The time comparison unit 49*b* reads a time at which the present execution of the operation program 41 was restarted, from the time storage unit 57. Then, the stop command unit 46 calculates the driving time of the robot 1 based on this time and a time at which the present execution of the operation program 41 was temporarily stopped. When the driving time of the robot 1 is less than the third time length, the stop command unit 46 performs control to inhibit the restart of the execution of the operation program 41. With this control, the restart of driving of the robot 1 can be inhibited when the cause for the previous temporary stop has not been sufficiently eliminated. Furthermore, an example of the third time length which can be employed is about one second.

The robot control apparatus of the present embodiment can judge the state of an external force applied to the robot after the robot is temporarily stopped, and according to the state of the external force, can perform control to automatically restart the execution of the operation program or control to maintain the stopped state. Accordingly, productivity of the robot can be improved while ensuring the safety of a worker.

Figure 4:
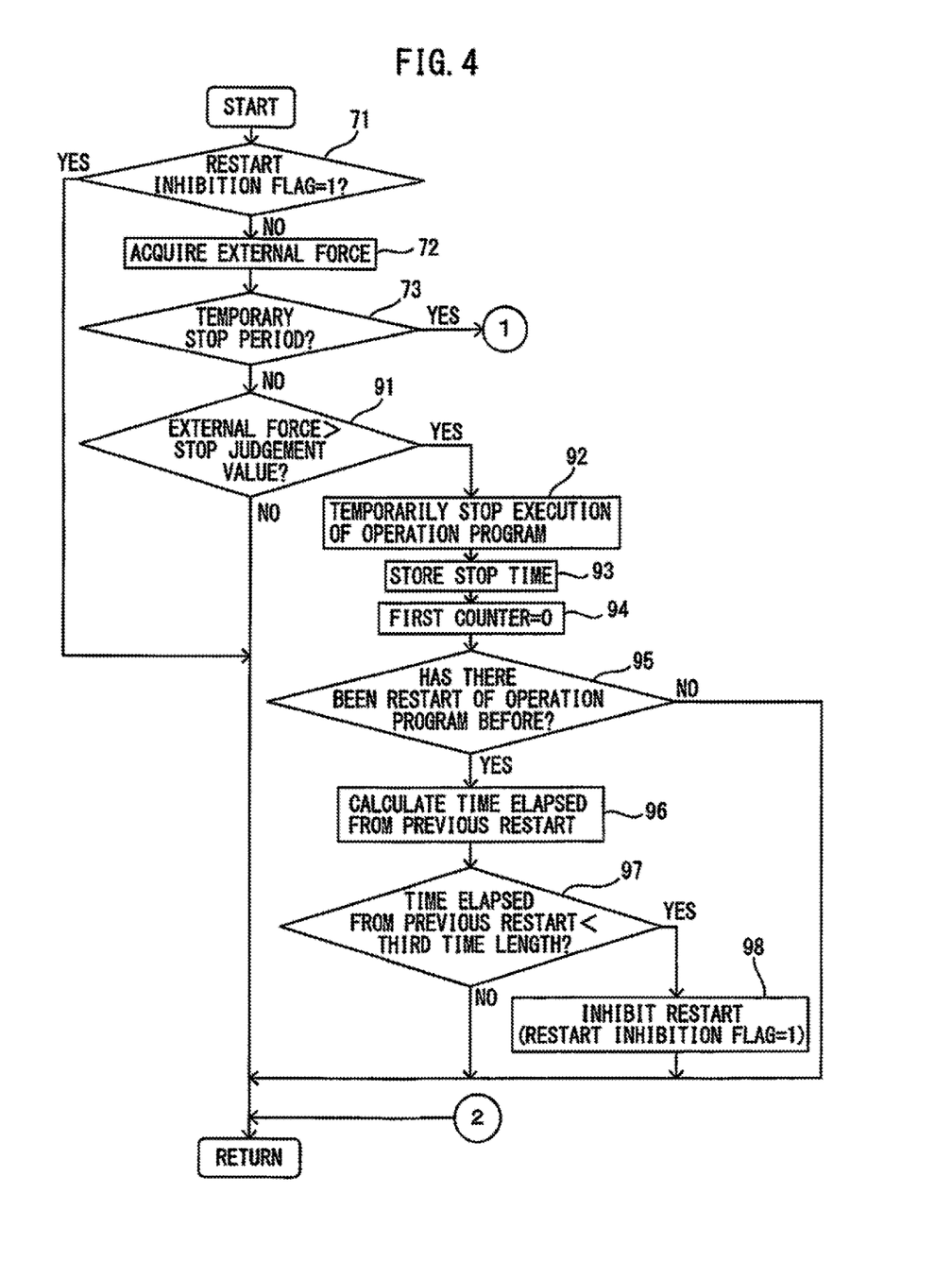
FIG. 4 is a first flowchart of operation control in the embodiment.
Figure 5:
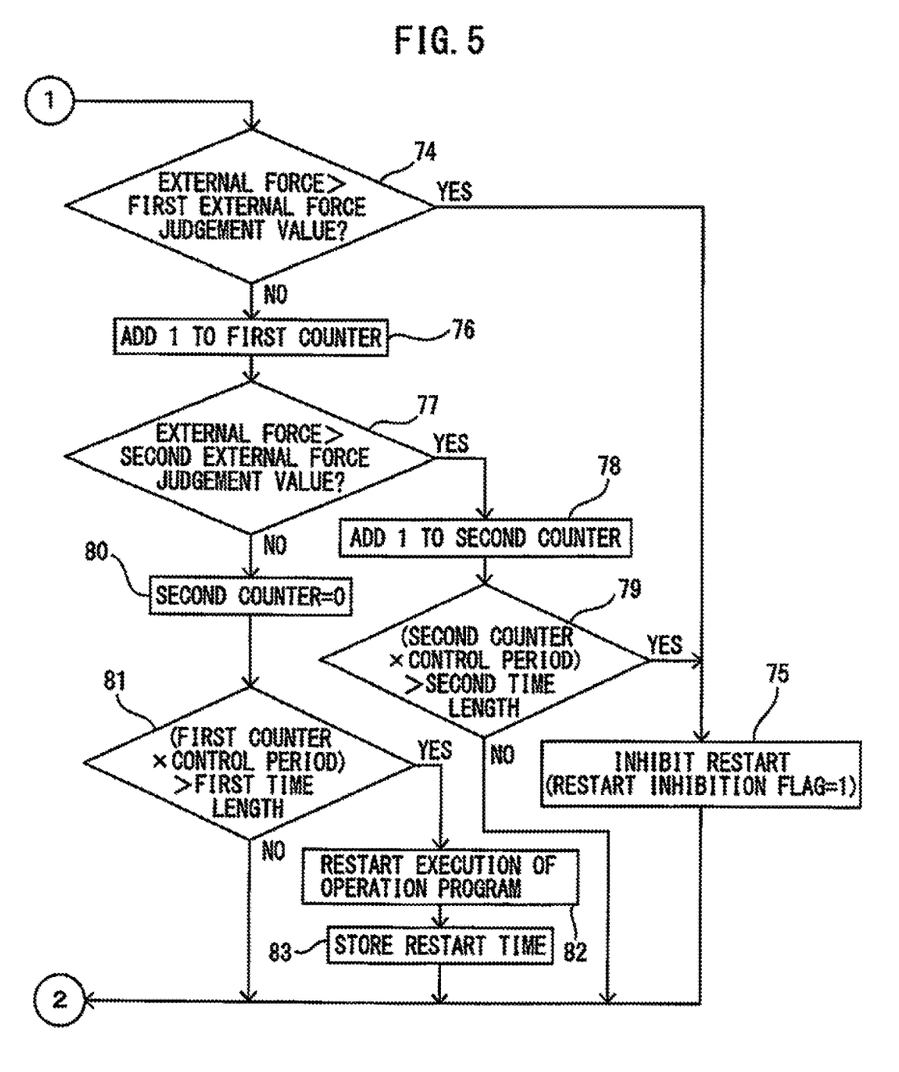
FIG. 5 is a second flowchart of the operation control in the embodiment.

FIGS. 4 and 5 show a flow chart of the control in the present embodiment. The control in FIGS. 4 and 5 can be repeatedly performed at each time interval previously determined by the stop command unit 46. Additionally, the control can be performed in the stop period of the robot and in the driving period of the robot.

Referring to FIGS. 2 to 5, at step 71, it is judged whether a restart inhibition flag is 1 or not. When the restart inhibition flag is 1, execution of the operation program 41 is temporarily stopped, and additionally, a restart of the execution of the operation program 41 is inhibited. This is a state where a command for restarting by a worker is being waited for. When the worker inputs a command for cancelling the inhibition of the restart to the stop command unit 46, the restart inhibition flag is changed to 0. At step 71, when the restart inhibition flag is 1, the control is ended. When the restart inhibition flag is 0, step 72 is performed. In other words, when the restart of the execution of the operation program 41 is not inhibited or when the worker cancels the inhibition of the restart, the routine proceeds to step 72.

At step 72, the external force estimation unit 48 estimates an external force applied to the robot 1. The external force judgement unit 49 acquires a calculated external force. At step 73, the external force judgement unit 49 judges whether or not it is a period during which execution of the operation program 41 is temporarily stopped. When the operation program 41 is being executed, step 91 is performed. This is a state where the robot 1 is being driven.

At step 91, the external force judgement unit 49 judges whether or not the external force is larger than the stop judgement value. When the external force is equal to or less than the stop judgement value, the control is ended. When the external force is larger than the stop judgement value, the routine proceeds to step 92.

At step 92, execution of the operation program is temporarily stopped. The stop command unit 46 sends a command for stopping the execution of the operation program 41 to the operation control unit 43. At step 93, the time storage unit 57 stores a time at which the execution of the operation program was temporarily stopped.

Next, at step 94, a first counter is set to 0. The first counter is a counter for calculating a time length when judging an external force based on the first external force judgement value. As will be described later, the first counter allows calculation of a time elapsed from the stop of the robot 1.

Next, at step 95, the stop command unit 46 judges whether or not there has been a restart of execution of the operation program before. In other words, it is judged whether or not control has been performed to restart the execution of the operation program in the past after a temporary stop due to an external force exceeding the stop judgement value. When there has been no restart of execution of the operation program before, the control is ended. When there has been a restart of execution of the operation program before, the routine proceeds to step 96.

At step 96, the time comparison unit 49b calculates a time elapsed from a time at which the previous execution of the operation program was restarted. In other words, the time comparison unit 49b calculates the driving time of the robot 1 from the restart of the execution to the stop thereof. The restart time of the previous execution of the operation program 41 is stored in the time storage unit 57. At step 97, the time comparison unit 49b judges whether or not the driving time of the robot is less than the third time length. When the driving time of the robot 1 is equal to or more than the third time length, the control is ended.

At step 97, when the driving time of the robot 1 is less than the third time length, the routine proceeds to step 98. In this case, it can be judged that the robot 1 was stopped immediately after restarting the driving thereof. Then, it can be judged that a previous cause for the temporary stop has not been sufficiently eliminated. At step 98, the stop command unit 46 sets the restart inhibition flag to 1. The stop command unit 46 sends a command for inhibiting the restart of execution of the operation program 41 to the operation control unit 43.

Next, a control during a period during which the robot 1 is temporarily stopped will be explained. At step 73, when the execution of the operation program 41 is temporarily stopped, the routine proceeds to step 74 of FIG. 5.

At step 74, the external force comparison unit 49a judges whether or not a calculated external force exceeds the first external force judgement value. When the external force exceeds the first external force judgement value, the routine proceeds to step 75. At step 75, the stop command unit 46 inhibits a restart of execution of the operation program 41. The stop command unit 46 sets the restart inhibition flag to 1 and also sends a command for inhibiting the restart of execution of the operation program 41 to the operation control unit 43.

At step 74, when the external force is equal to or less than the first external force judgement value, the routine proceeds to step 76. At step 76, 1 is added to the first counter. In other words, 1 is added to the first counter for calculating a time elapsed from the stop.

Next, at step 77, it is judged whether or not the external force exceeds the second external force judgement value. When the external force is equal to or less than the second external force judgement value, the routine proceeds to step 80.

At step 80, the second counter is set to 0. The second counter is a counter for calculating a time length when judging an external force based on the second external force judgement value. The second counter allows calculation of a time elapsed from a time at which the external force exceeded the second external force judgement value.

Next, at step 81, the time comparison unit 49b multiplies the value of the first counter by a control period to calculate a time elapsed from the stop of the execution of the operation program 41. An example of the control period can be a time interval in which the control of FIGS. 4 and 5 is performed. The control period can be previously-stored in the time storage unit 57. The time comparison unit 49b judges whether or not the elapsed time is longer than the first time length. When the elapsed time is equal to or less than the first time length, the control is ended. When the elapsed time is longer than the first time length, it can be judged that the external force is continuously equal to or less than the first external force judgement value during the period of the first time length. In this case, the routine proceeds to step 82.

At step 82, execution of the operation program is automatically restarted. The stop command unit 46 sends a command for restarting the execution of the operation program 41 to the operation control unit 43. The operation control unit 43 restarts the execution of the operation program 41. At step 83, the time storage unit 57 stores a time at which the execution of the operation program was restarted.

At step 77, when the external force exceeds the second external force judgement value, the routine proceeds to step 78. At step 78, 1 is added to the second counter.

Next, at step 79, the time comparison unit 49b multiplies the second counter by the control period to calculate a time elapsed from a time at which the external force exceeded the second external force judgement value. The time comparison unit 49b judges whether or not the elapsed time exceeds the second time length. When the elapsed time is equal to or less than the second time length, the control is ended. On the other hand, when the elapsed time exceeds the second time length, it can be judged that the external force continuously exceeds the second external force judgement value during the period of the second time length. Then, the routine proceeds to step 75, and the stop command unit 46 performs control to inhibit a restart of the execution of the operation program 41.

In the present embodiment, the stop command unit judges whether or not the external force exceeds the first external force judgement value during the period of the first time length from a time at which execution of the operation program was temporarily stopped. The present invention is not limited to this embodiment, and the stop command unit can judge whether or not, during a period during which the execution of the operation program is temporarily stopped, the external force continuously exceeds the first external force judgement value during a period of the first time length where an arbitrary time is set as a start time.

While the present embodiment has been described by exemplifying the multi-joint robot, the invention is not limited thereto. The invention can be applied to any robot control apparatus for controlling an arbitrary robot.

The present invention can provide a robot control apparatus which judges a restart of an operation program or maintaining of a stop thereof according to a state where an external force is applied after a robot is temporarily stopped.

In each control described above, the order of the steps can be changed as appropriate in a range not changing functions and effects of the invention. The embodiments described above can be combined as appropriate. In each drawing described above, the same or equal parts are denoted by the same signs. The embodiments described above are examples and do not limit the invention. In addition, the embodiments include changes of the embodiments, as described in the claims.

The invention claimed is:

1. A robot control apparatus which controls a robot driven based on an operation program, the robot control apparatus comprising:

an external force estimation unit which estimates the external force applied to the robot;

a stop command unit which stops the robot on a basis of an external force; and a judgement value storage unit which stores judgement values relating to the external force, wherein the judgement value storage unit previously stores a stop judgement value for temporarily stopping the robot, a first external force judgement value smaller than the stop judgement value and for restarting driving of the robot, and a second external force judgement value smaller than the first external force judgement value; and the stop command unit performs control to temporarily stop execution of the operation program when the external force exceeds the stop judgement value during a period during which the robot is driven based on the operation program, performs control to restart the execution of the operation program when, in a state where the execution of the operation program is temporarily stopped, the external force is continuously equal to or less than the first external force judgement value during a period of a predetermined first time length, and additionally, a time length in which the external force continuously exceeds the second external force judgement value is equal to or less than a predetermined second time length, and performs control to inhibit a restart of the execution of the operation program when, in a state where the execution of the operation program is temporarily stopped, the external force is continuously equal to or less than the first external force judgement value during a period of the predetermined first time length, and additionally, the time length in which the external force continuously exceeds the second external force judgement value is more than the second time length.

2. The robot control apparatus according to claim 1, further comprising a time storage unit which stores a time at which the execution of the operation program is restarted based on the first external force judgement value; wherein when the execution of the operation program is temporarily stopped after restarting the execution of the operation program, the stop command unit calculates a driving time of the robot from the restart to the stop, and performs control to inhibit the restart of the execution of the operation program when the driving time is less than a predetermined third time length.

3. The robot control apparatus according to claim 1, wherein the stop command unit performs control to inhibit the restart of the execution of the operation program when the external force exceeds the first external force judgement value during a period of the first time length from a time at which the execution of the operation program is temporarily stopped.

* * * * *